July 10, 1945.   M. WATTER   2,380,091
HINGE SUPPORT
Filed Sept. 23, 1943

INVENTOR
Michael Watter

BY John P. Tanbox
ATTORNEY

Patented July 10, 1945

2,380,091

UNITED STATES PATENT OFFICE 2,380,091

HINGE SUPPORT

Michael Watter, Philadelphia, Pa., assignor to Edward G. Budd Manufacturing Company, Philadelphia, Pa., a corporation of Pennsylvania Application September 23, 1943, Serial No. 503,505

6 Claims. (Cl. 214—85)

This invention relates to a ramp hinge support, particularly for a ramp which forms a closure for an aircraft fuselage opening during flight; and has for an object the provision of improvements in this art.

One of the particular objects of the invention is to provide a relatively light hinge which will support the weight of the ramp alone and a relatively more substantial auxiliary structure for supporting the loads imposed upon the ramp.

Another object is to provide a hinge which will accurately guide the ramp and hold it securely in position but which is sufficiently light to yield without injury when a heavier load is applied to permit the more substantial auxiliary structure to take the heavier loads.

The above and other objects of the invention will be apparent from the following description of an exemplary embodiment thereof, reference being made to the accompanying drawing, wherein.

Figure 1:
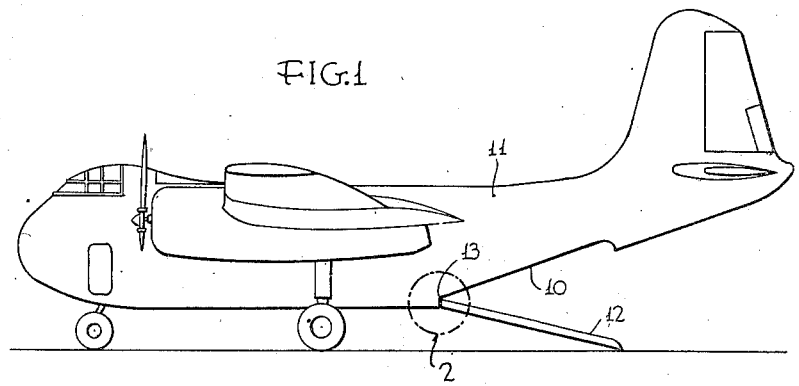
Fig. 1 is a side elevation of a cargo airplane on the ground with the ramp down.

Referring to the drawing, a cargo airplane is provided with a bottom opening 10 in the rear portion of its fuselage 11 and a ramp 12 hinged at its front end, as at 13, to the front edge of the opening. In flight the ramp is swung up to close the opening and may be let down, as when the airplane is on the ground, for loading cargo or personnel.

Figure 2:
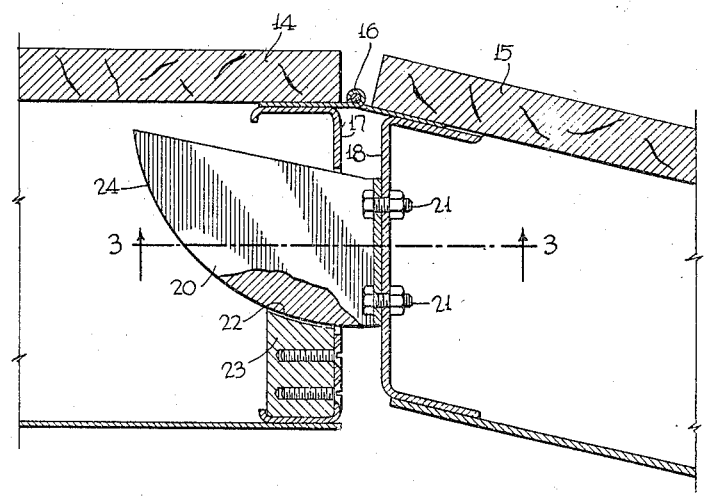
Fig. 2 is an enlarged vertical section of the ramp hinge region, the general location of the section being indicated by the broken line circle 2 in Fig. 1.
Figure 3:
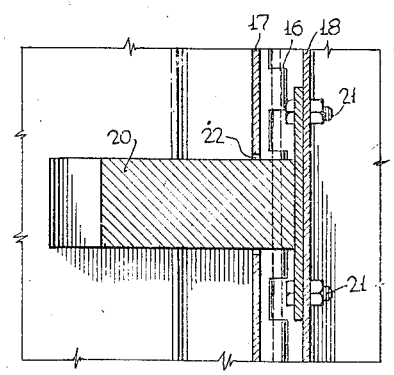
Fig. 3 is a horizontal section taken on the line 3—3 of Fig. 2.

As shown in Fig. 2, the fuselage and ramp are provided with substantial floors 14 and 15, respectively, to take the loads and spread them over wide areas.

A relatively light piano type hinge 16 is secured between the fuselage beam 17 and the ramp beam 18 adjacent the upper edge. This hinge is strong enough to take the weight of the ramp but is yieldable under heavier loads.

In order to take the heavy loads, as of a vehicle moving upon the ramp, there is provided an auxiliary support member 20 which is secured, as by bolts 21, to the front beam of the ramp and which enters an opening 22 in the fuselage beam. Beneath the opening there is secured a thrust block 23 which normally is spaced slightly below the lower arcuate edge 24 of the support member 20 but upon which the support member bears when the load on the ramp exceeds that which the hinge will carry.

There are a plurality of these support members 20 and thrust blocks 23 across the length of the hinge line. They carry the loads in compression hence will carry a very heavy load for a small size and weight in the airplane construction. They are sufficiently rigid to prevent deflection beyond the resiliency of the hinge, hence when the temporary load on the ramp is removed the hinge will spring back into its normal position. The auxiliary support is intended principally for taking temporary burdens during loading and unloading; but it will serve also if the ramp is loaded in its closed position.

It is thus seen that the invention provides a light dependable hinge construction for ramps and the like for use in connection with airplanes or elsewhere.

While one embodiment has been described for purposes of illustration, it is to be understood that the invention may have various embodiments within the limits of the prior art and the scope of the subjoined claims.

What is claimed is:

1. A hinge construction adapted for the support of one end of a ramp or like part which is subject to heavy loading transversely of the hinge axis, comprising a first hinge means providing arcuate movement between the hinged part and a connected part, and a second hinge means providing load-carrying surfaces concentric with the axis of the first hinge means.

2. A hinge construction adapted for the support of one end of a ramp or like part which is subject to heavy loading transversely of the hinge axis, comprising a first hinge means of light construction which keeps the hinged parts connected during their relative turning movement, and a second hinge means of heavier construction which takes large loads, said second hinge means having load-carrying surfaces concentric with the axis of the first hinge means.

3. A hinge construction adapted for the support of one end of a ramp or like part which is subject to heavy loading transversely of the hinge axis, comprising a first hinge means having relatively movable surfaces of small radius, connecting the parts, and a second hinge means, having relatively movable surfaces concentric with and of larger radius than the first said surfaces, arranged to take loadings above those which the first hinge means is adapted to take.

4. A hinge construction adapted for the support of one end of a ramp or like part which is subject to heavy loading tranversely of the hinge axis, comprising a first hinge means having relatively movable surfaces of small radius, connecting the parts, and a second hinge means, having relatively movable surfaces concentric with and of larger radius than the first said surface, arranged to take loadings above those which the first hinge means is adapted to take, the surfaces of said second hinge means standing apart for light loads but engaging for heavier loads.

5. A hinge construction comprising a ramp having a frame element at the hinged end and a floor thereabove, a supporting body having a frame element at the edge of an opening where the ramp is hinged, said supporting body having a floor aligning with the ramp floor, a relatively light hinge means adjacent the floors for supporting the ramp alone, and an auxiliary arcuate pressure-taking hinge means carried by one of said frame elements and having a pressure face located adjacent a pressure face on the other frame element for taking heavier loads above the weight of the ramp in any hinged position of the ramp.

6. A hinge construction as set forth in claim 5, wherein said auxiliary arcuate hinge means is secured to the end of the ramp and operates through a slot in the frame element of the supporting body.

MICHAEL WATTER.